(12) United States Patent
van Gijsel et al.

(10) Patent No.: US 6,290,426 B1
(45) Date of Patent: Sep. 18, 2001

(54) THREADED ROD AND STRUT CONNECTOR AND METHOD

(75) Inventors: Gerardus Emanuel Cornelius van Gijsel, Goirle (NL); Stefan Walter Huwer, Geiselberg (DE)

(73) Assignee: Erico International Corporation, Solon, OH (US)

( * ) Notice: Subject to any disclaimer, the term of this patent is extended or adjusted under 35 U.S.C. 154(b) by 0 days.

(21) Appl. No.: 09/293,922

(22) Filed: Apr. 16, 1999

Related U.S. Application Data
(60) Provisional application No. 60/082,087, filed on Apr. 17, 1998.

(51) Int. Cl.[7] .................................................. F16B 37/04
(52) U.S. Cl. .................... 403/374.3; 403/256; 403/247; 411/85
(58) Field of Search ............................ 403/11, 256, 257, 403/258, 247, 231, 374.3, 348; 411/85, 104

(56) References Cited

U.S. PATENT DOCUMENTS

| | | | |
|---|---|---|---|
| 2,767,609 | * 10/1956 | Cousino . | |
| 4,460,299 | * 7/1984 | Kowaiski | 411/85 |
| 4,575,295 | * 3/1986 | Rebentisch | 411/85 |
| 4,783,040 | 11/1988 | Lindberg et al. . | |
| 4,784,552 | * 11/1988 | Rebentisch | 411/85 |
| 4,830,531 | * 5/1989 | Condit et al. . | |
| 4,950,099 | * 8/1990 | Roellin | 411/85 |
| 5,375,798 | * 12/1994 | Hungerford . | |
| 5,489,173 | * 2/1996 | Hofle | 411/85 |
| 5,628,597 | * 5/1997 | Chudoba et al. | 411/85 |

FOREIGN PATENT DOCUMENTS

| | | | |
|---|---|---|---|
| 19 50 662 U | 1/1966 | (DE) . | |
| 0805297 | * 5/1997 | (DE) . | |
| 0 805 297 A2 | 5/1997 | (EP) . | |
| 6603194 | * 10/1966 | (NL) | 403/231 |

OTHER PUBLICATIONS

Erico, fixings and supports for electrical installations, pp. 89–90.*
Erico catalog, pp. 105, 107 and 109.*
Caddy Fasteners catalog.*
European Search Report dated Mar. 8, 1999.
Erico, Fixings and supports for electrical installations, Date unknown, pp. 89–90, but prior art.
Erico catalog, Date unknown, pp. 105, 107, and 109, but prior art.
Caddy Fasteners catalog, date unknown.

* cited by examiner

Primary Examiner—Lynne H. Browne
Assistant Examiner—Tomlyne A Malcolm
(74) Attorney, Agent, or Firm—Renner, Otto, Boisselle & Sklar

(57) ABSTRACT

A strut-rod connector enables the rod to be quickly and easily attached at any adjusted position along the strut, or axially adjusted. The connector has an internal and external head assembled to each other for limited rocking and opening and closing movement. The rod is threaded in the inner head and extends through a transverse slot in the outer head. A lock nut quickly clamps the parts together, and each self-centers on the legs of the strut. The connection can be made by simply rocking the assembly of the two heads and rod to insert the assembly and rod at any desired location. Tightening a lock nut centers and clamps the assembly and rod in place. Optimum loading in either axial direction of the rod is provided.

18 Claims, 2 Drawing Sheets

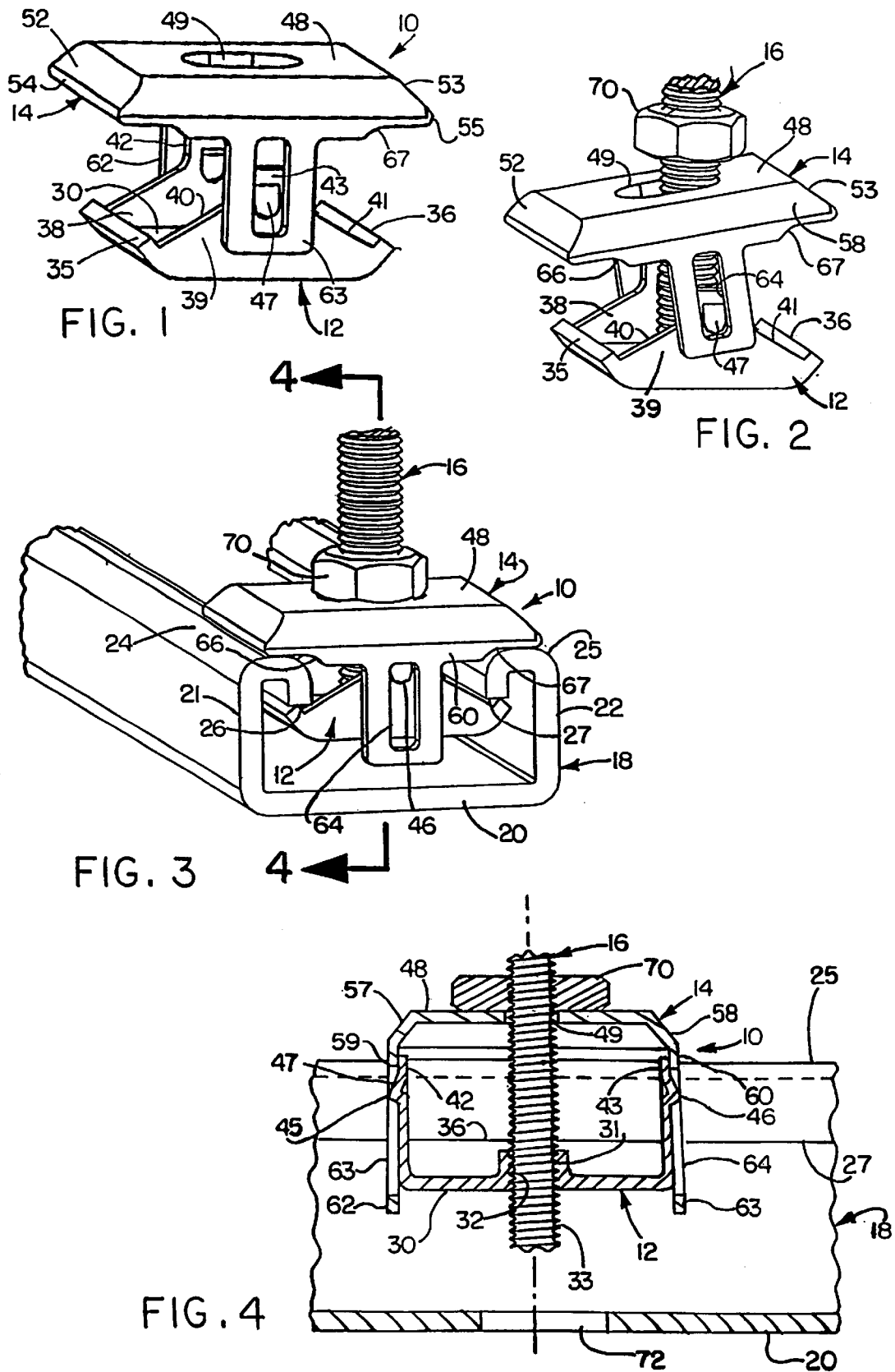

THREADED ROD AND STRUT CONNECTOR AND METHOD

DISCLOSURE

This application claims the benefit of U.S. Provisional Application Ser.No. 60/082,087, filed Apr. 17, 1998. This invention relates generally to a connector for threaded rod and strut, and more particularly to the connector, and to a method of installing and adjusting the same.

BACKGROUND OF THE INVENTION

Channel or U-shape strut is widely used in the construction industry. It is used to form vertical, horizontal or even angular framing. It may be hung from ceilings or attached to or embedded in walls or ceilings. Conventional struts are U-shape or channel shape, and the legs terminate in a rolled or inturned short radius circular fold so that the inturned legs terminate in an inwardly facing edge. The opening of the channel is thus restricted, and the legs are in the form of two continuous hooks. A wide variety of fasteners, hangers or brackets are used to support utilities, such as pipes, conduit, lighting, cable trays, and air conditioning or ventilation duct work, for example.

One of the most common adjustable hanging or supporting devices used is the common threaded rod. To connect the rod to the strut, a strut nut is normally employed. The strut nut has two parallel grooves in one surface which are designed to seat on the parallel inturned edges of the channel legs. The strut nut is usually a machined block rectangular in shape, so that it has a narrow dimension enabling it to be inserted into the channel between the inturned edge legs and rotated 90° to span the edges of the legs. This normally has to be done by hand with the installer's fingers being inserted in the channel and twisting the nut. The nuts are often provided with unwieldy compression springs to push the nut from the bottom of the channel once seated to maintain the grooves on the inturned leg edges. Trying to thread a rod into the nut may compress the spring excessively causing the nut to slip and making the proper insertion of the rod difficult.

In some arrangements, particularly with square nuts, the nuts have to be inserted or threaded into the end of the channel. Square nuts are sometimes used with strut or channel that has a series of holes in the back, with the rod threaded in the nut extending downwardly through the hole. Sometimes the nuts are simply loose in the channel or strut, relying solely only on the weight of the load to keep them in place. Some systems use one kind of nut for the open side of the channel or strut, and another for the other or back of the channel.

A rod can also be secured to a strut using what is known as a hammerhead which seats on the outer turned portion of the strut legs. The rod extends through the hammerhead and through the bottom of the strut. Conventional nuts and optionally washers are threaded to bear against the hammerhead and bottom of the strut, respectively. Proper alignment or adjustment either axially of the rod or along the strut is difficult and time consuming. Final installation is also difficult and time consuming, requiring the positioning and tightening of at least two nuts. If adjustment is required, then loosening, repositioning and retightening are required.

Hammerheads and nuts can be utilized together with a common fastener such as a bolt. Such assemblies are used sometimes to splice strut sections or to act as stops for other type fasteners securing pipe, for example, to the strut. Examples of such assemblies are seen in prior U.S. Pat. No. 4,783,040 to Lindberg, et al.

There is a need for a fastening system which can firmly clamp a length of threaded rod to the strut and support the rod and any load on the strut for full compressive or tensile loading on the rod. There is also a need for a rod-strut connecting system which can easily be preassembled and inserted in the channel for adjustment, both along the strut, or axially of the rod, before being tightly clamped and affixed to the strut.

SUMMARY OF THE INVENTION

A rod connector is employed for channel shape strut of the type having legs with inturned edges. The connector includes an internal head with a central plate having a threaded hole adapted to receive a threaded rod. The hole is extruded from the plate and has rolled internal threads matching the external threads of the rod. When the rod is threaded in the hole, it is maintained perpendicular to the plate.

The internal head includes, along parallel edges, upturned edges designed to seat under the inturned edges of the strut legs. Opposite parallel edges of the internal head are provided with angular symmetrical flanges having sloping edges adapted to pilot and center the internal head within the strut. Projecting upwardly from the center of the flanges are flange extensions which each include a pressed out projection or pintle. The pintles include sloping or wedge exterior surfaces.

The external head is also formed from a plate which includes a centered slot extending transversely of the strut and which accommodates the threaded rod. The external head includes stiffening flanges with the lateral flanges parallel to the slot and transverse the strut including seats for centering the external head on the inside surfaces of the external turned portion of the strut legs. This enables the external head to be centered and seated easily when clamped, and yet be free to slide or move when unclamped. The lateral flanges also include flange extensions, each of which has a slot. The flange extension slots are parallel to each other. The flange extensions of the external head telescope over the flange extensions of the internal head, and the sloping or wedge surface slightly separates the slotted flange extensions of the external head until the projections or pintles snap into the slots. The two heads are then connected for relative pivoting movement and limited separating and closing movement. The limitation of the separating movement is the length of the slots in the external head flange extensions. With the rod secured to the internal head and projecting through the slot in the external head, the relative pivoting movement is limited by the length of the transverse slot in the external head central plate.

In assembly, a lock nut may be threaded on the end of a threaded rod, allowing room to the rod end. The assembled head is then threaded on the rod end, with the rod passing through the external head slot and being threaded in the threaded hole in the inner head. The assembly may then be inserted in the strut simply by rocking the rod to one side, enabling the inner head to be inserted through the strut opening and then rocked back to a centered position. The flange edge on the internal head pilots and centers the head inside the strut. The limited rocking movement between the two heads enables this ease of insertion without interference. The rod may be adjusted axially to bear against the bottom of the strut or go through a hole in the bottom of the strut. With the lock nut loose, this may be accomplished simply by turning the rod. With the lock nut loose, the assembly may also slide along the strut to any desired location.

When in the desired location, the lock nut is simply tightened. The pilot flanges on the inner head, and the seats on the flanges of the outer head ensure that the two heads properly seat on and grip the inturned edges of the strut legs, and the external turned portion, respectively. The clamping and proper seating is obtained with a few turns of the lock nut. When clamped, substantial loading of the rod with respect to the strut is obtainable in either axial direction.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is an assembled perspective view of the two parts of the rod connector of the present invention;

FIG. 2 is a similar view showing the rod assembled and the rocking capability of the external head;

FIG. 3 is a similar view showing the rod clamped to the strut;

FIG. 4 is a fragmentary transverse section through the assembly taken substantially through the center of the strut as shown from the line 4—4 of FIG. 3;

DETAILED DESCRIPTION OF THE PREFERRED EMBODIMENTS

Figure 5:
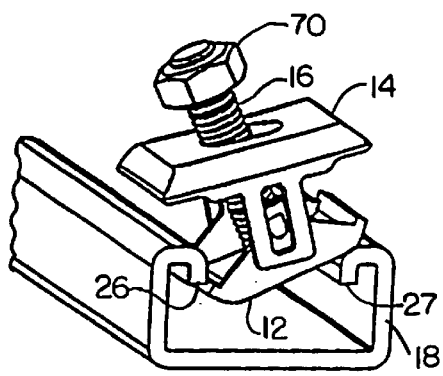
FIGS. 5–7 are sequence views on a reduced scale of the insertion and clamping process.

Referring initially to FIGS. 1–3, it will be seen that the connector assembly is shown generally at 10 and is an assembly of an interior part or head 12 and an exterior part or head 14. The purpose of the connector is to secure firmly a threaded rod 16 seen in FIGS. 2 and 3 to the strut 18 seen in FIG. 3.

As indicated most clearly in FIG. 3, the strut 18 is channel-shape or U-shape and includes a back 20, parallel legs 21 and 22 extending from the back, with the legs being inturned or curved in the open fold or roll seen at 24 and 25, respectively, each terminating in inturned edges seen at 26 and 27, respectively. The legs are thus in the form of continuous inturned hooks. The struts may be several meters long and may be used in a wide variety of construction arrangements. The struts normally support a wide variety of utilities with various types of fasteners which fit within the more narrow open side of the strut formed by the inturned legs.

Referring now additionally to FIG. 4, it will be seen that the inner part or head 12 includes a central plate 30 with an extruded central hole 31 having internal rolled threads 32. The internal threads 32 in the hole 31 match the external threads 33 on the threaded rod 16. The central plate 30 of the interior head or part 12 is generally rectangular and is designed to span beneath the leg edges 26 and 27. The parallel end edges of the plate 30 are upturned as indicated at 35 and 36 to fit beneath and engage the strut leg edges. The bottom head also includes transverse or lateral flanges seen at 38 and 39, each of which includes symmetrical sloping edges 40 and 41. At the apex of such edges, there is provided an upwardly extending flange extension as seen at 42 and 43, for the lateral flanges 38 and 39, respectively. The flange extensions are each provided with a press-out forming a pintle indicated at 45 and 46, respectively. The press-outs are symmetrical, and each includes a sloping outer surface 47. The upturned edges 35 and 36 together with the flanges 38 and 39 and the sloping symmetrical surfaces thereof provide an extremely rigid and strong interior part or head.

The outer or exterior part or head 14 is also significantly rigid and includes a central rectangular plate 48 which is provided with an elongated central slot 49 which extends transversely of the strut but lengthwise of the plate. The plate is designed rigidly to span the exterior of the strut between the exterior of the legs.

The exterior part is provided with sloping stiffening flanges 52 and 53 at each end which terminate in down-turned relatively short flange edges seen at 54 and 55. The longer side of the rectangle is closed by sloping flanges 57 and 58 which terminate in downwardly extending edges or skirts 59 and 60. These skirts form stiffening flanges extending transversely of the strut, and each includes a flange extension seen at 62 and 63 which include slots 63 and 64, respectively, which are slightly wider than the press-out or pintles 45 and 46.

The flange extensions 62 and 63 are designed to telescope over the flange extensions 42 and 43 of the inner head, and the wedge surfaces 47 cause such extensions to separate slightly enabling the press-out or pintle to snap into the respective slot of the exterior head. In this manner, the two parts are then assembled as in FIGS. 1–4.

It is noted that the edges of the skirts 59 and 60 of the exterior part are provided with concave seats seen at 66 and 67 seen in FIGS. 2 and 3 on each side. These surfaces are designed to mate with and engage the interior or inner part of the exterior curvature of the legs of the strut seating and centering the assembly therebetween. It is noted also that the symmetrical angular edges 40 and 41 of the interior part or head also are designed to engage the interior edges of the strut legs so that the interior part is automatically piloted and centered between the legs when clamping pressure is applied. The parts, when snapped together as in FIG. 1, form the connector assembly 10. The exterior part may then move with respect to the interior part to the extent of the slot in the flange extensions on the exterior part. The exterior part may also pivot with respect to the interior part.

In the assembly process, a lock nut shown at 70 is threaded on the rod allowing some room to the end of the rod. The rod 16 with the lock nut thereon is then inserted through slot 49 and threaded into the hole 31 securing the inner part or head to the rod. This forms an assembly on the end of a rod section which comprises the rod, lock nut, and the assembly of the inner and outer heads. In some assemblies, the end of the threaded rod may be blocked against turning with respect to the inner part 12 by a suitable thread deformation, for example. This assembly becomes a connector system and may be sold as such.

With the assembly, the relative rocking movement of the exterior part 14 with respect to the interior part is limited by the length of the slot 49. The separating or closing movement of the two parts is, however, still limited only by the length of the slots 63 and 64 and the position of the lock nut.

Figure 6:
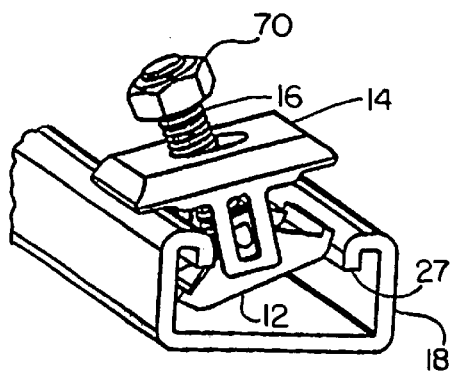

Referring now to FIGS. 5 and 6, the assembly of the rod and connector system to the strut is illustrated. The rod and the assembly thereon is rocked or tilted toward the left as seen in FIG. 5, so that the left hand edge of the inner part slips under the left hand leg edge of the strut. The exterior part rocks to a cleared position as seen, enabling the entire interior part or head to be inserted through the slot by the canting of both the interior part and the rod 16. When the right hand edge of the inner part clears the right hand leg edge of the strut as seen in FIG. 6, the assembly may then rock back to the position seen in FIG. 7. As the lock nut 70 is tightened, the parts move together, and the piloting or seating edges 40 and 41 of the inner part center the inner part between the inturned strut leg edges. The pilot seats 66 and 67 of the outer part or head also ensure that the outer part is centered between the exterior of the legs. The tightening of the lock nut 70 locks the assembly in place with the rod projecting from the assembly as shown. Before the final tightening of the assembly, the assembly may be positioned anywhere along the strut and is easily slid along the strut to the desired location. Also, the rod itself may be adjusted axially. As illustrated in FIG. 4, the bottom of the strut may be provided with a series of holes indicated at 72. Accordingly, the threaded rod may be adjusted to extend through such holes, or it may be adjusted to abut against the bottom wall of the strut as seen in FIG. 8.

Figure 7:
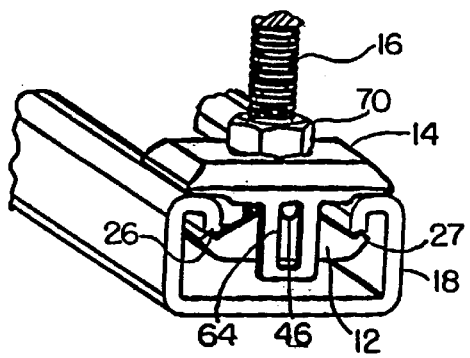
Figure 8:
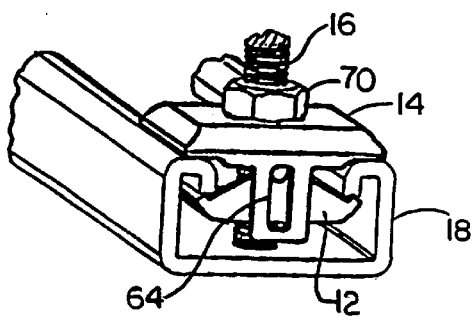
FIG. 8 is a similar view showing the rod adjusted.
Figure 9:
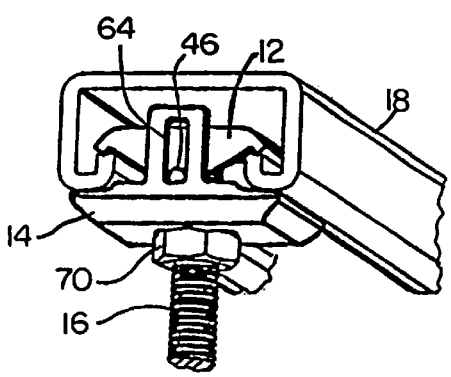
FIG. 9 is a view like FIG. 7 but showing the strut inverted and rod projecting downwardly.

In comparing FIGS. 9 and 7, for example, it will be seen that the strut 18 illustrated is inverted. In FIG. 7, the open side of the strut faces upwardly, and the rod 16 extends upwardly and may support a downwardly pressing load. In FIG. 9 however, the rod 16 extends downwardly and may support a hanging load. Whether the load on the rod is compressive or tensile, optimum loads are obtainable in either axial direction of the rod.

To adjust the connector longitudinally of the strut, the lock nut may be partially closed or tightened and the assembly moved along the strut before being finally tightened in the desired location.

It can now be seen that with the connection of the present invention, the connection can be made without inserting separate parts into the interior of the channel, and the assembly does not require to be threaded in from the end of the strut. The relative pivoting movement of the exterior part with respect to the interior part and the rod enables the assembly to be inserted quickly through the restricted opening of the strut and adjusted and quickly locked in place. The flanges or seats on the two heads ensure that the two heads properly seat on and grip the inturned edges of the strut legs and the external turned portion of the legs. When clamped, a substantial loading of the rod with respect to the strut is obtainable in either axial direction of the rod.

To the accomplishment of the foregoing and related ends, the invention then comprises the features particularly pointed out in the claims, these being indicative, however, of but a few of the various ways in which the principles of the invention may be employed.

What is claimed is:

1. A rod connector for a U-shape strut having legs with inturned edges, said connector including an internal head, a projecting rod secured to said internal head, said internal head being shaped to seat and center on the intumed edges internally of the strut, an external head connected to and relatively movable with respect to said internal head for limited relative tilting movement and through which the rod extends and from which it projects, said external head being shaped to seat and center externally on the turned portion of the legs, and means to clamp the two heads together generally parallel to each other gripping the external turned portion and the inturned edges of the legs of the strut therebetween while supporting and connecting the rod to the strut.

2. A rod connector as set forth in claim 1 wherein said internal head includes a threaded hole, said rod being threaded in and secured to said hole.

3. A rod connector as set forth in claim 2 wherein said internal and external heads are formed of sheet metal plates.

4. A rod connector as set forth in claim 3 wherein said threaded hole is extruded and provided with rolled internal threads matching those of the rod.

5. A rod connector as set forth in claim 1 wherein said internal and external heads are connected to each other for limited relative separating and closing movement.

6. A rod connector as set forth in claim 1 wherein said internal head and said external head are connected to each other for both limited relative tilting movement when unclamped and for limited relative separating and closing movement.

7. A rod connector as set forth in claim 1 including a slot in said external head through which said threaded rod projects accommodating said external head for said limited relative tilting movement with respect to said rod and internal head.

8. A rod connector as set forth in claim 1 wherein said internal and external heads are formed of sheet metal plates, which include flanges for strength, each including flange extensions forming the connection between the two heads.

9. A rod connector as set forth in claim 8 wherein the flange extensions of one head include parallel slots, while the flange extensions of the other include snap-in pintles.

10. A rod connector as set forth in claim 8 wherein the flanges include sharp edges for centering the heads with respect to the strut.

11. A rod connector as set forth in claim 2 including a lock nut threaded on said rod adapted to bear against the external head when tightened.

12. A rod connector as set forth in claim 11 including means responsive to limited loosening of said nut to enable adjustment of the connector along the strut or to insert or remove the connector with respect to the strut.

13. A rod connector as set forth in claim 1 including a threaded rod threaded into said internal head, and a lock nut on said threaded rod operative to clamp the two heads together when the internal head is inserted in the strut.

14. A rod connector as set forth in claim 1 including in combination the strut against which the connector is clamped to achieve rod loading in either axial direction of the rod.

15. A method of securing a threaded rod to a strut having inturned legs and a restricted opening, assembling an inner and outer part to each other, while permitting limited relative tilting and separation, securing the parts to the rod, tilting the rod and inner part to insert the inner part into the restricted opening of the strut, the limited tilting of the outer part providing clearance for the insertion of the inner part, and then clamping the parts together with the strut legs therebetween to clamp the rod to the strut.

16. A method as set forth in claim 15 including the step of providing the outer part with a slot, permitting yet limiting the tilting of the outer part with respect to the threaded rod.

17. A method as set forth in claim 16 including the step of utilizing a lock nut on the threaded rod to lock the parts together.

18. A method as set forth in claim 17 including the step of providing both parts with centering seats to center the parts on the strut legs as they are clamped.

* * * * *